United States Patent [19]
Horn

[11] Patent Number: 4,793,262
[45] Date of Patent: Dec. 27, 1988

[54] TRANSPORT SYSTEM FOR COMPUTER INTEGRATED MANUFACTURING/STORAGE AND DRIVE COMPONENT THEREFOR

[75] Inventor: George W. Horn, Concord, Mass.

[73] Assignee: Middlesex General Industries, Inc., Woburn, Mass.

[21] Appl. No.: 915,147

[22] Filed: Oct. 3, 1987

[51] Int. Cl.$^4$ .............................................. B61B 13/00
[52] U.S. Cl. ...................................... 104/168; 104/48; 104/130
[58] Field of Search ................... 104/48, 96, 130, 131, 104/168, 282

[56] References Cited

U.S. PATENT DOCUMENTS

| | | | |
|---|---|---|---|
| 3,807,312 | 4/1974 | Flodell | 104/130 |
| 3,845,718 | 11/1974 | Rogers et al. | 104/96 X |
| 3,854,412 | 12/1974 | Dull | 104/282 X |
| 4,055,123 | 10/1977 | Heidelberg | 104/282 X |
| 4,356,772 | 11/1982 | Van Der Heide | 104/282 |
| 4,387,935 | 6/1983 | Studer | 104/282 X |
| 4,416,202 | 11/1983 | Rooklyn | 104/130 X |
| 4,530,287 | 7/1985 | Sticht | 104/168 |

Primary Examiner—Robert B. Reeves
Assistant Examiner—Russell D. Stormer
Attorney, Agent, or Firm—Jerry Cohen

[57] ABSTRACT

Parts transport system for factory operations and the like comprising arranged length sections (1) defining a transport path, workpiece supports (20) riding on the path and drive wheels (24) along the path for engaging the supports, corner drive members (18) and an effective modularity using integrally multiplied length sections in combination with the corners which are a basic unit of such integral multiplication series.

11 Claims, 4 Drawing Sheets

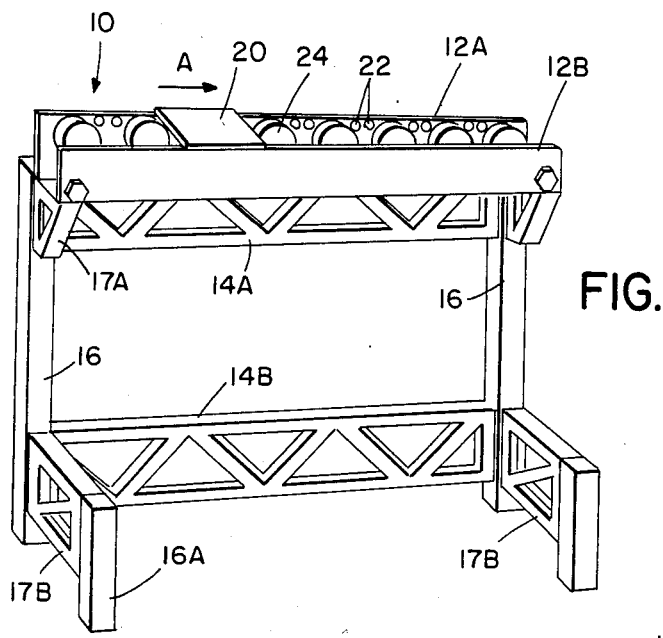
FIG. 1
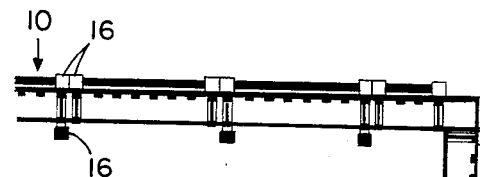
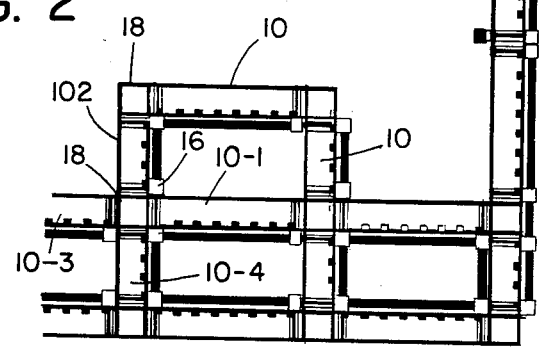
FIG. 2
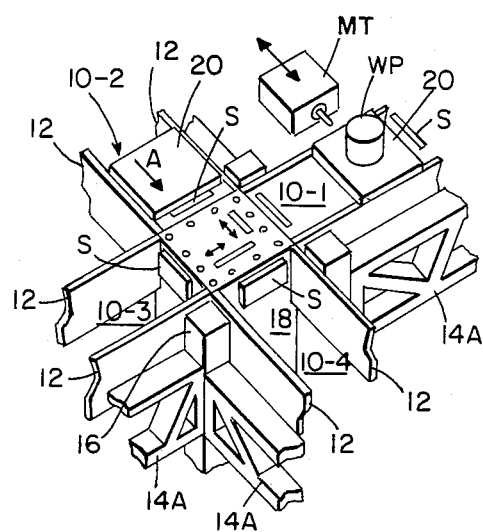
FIG. 3

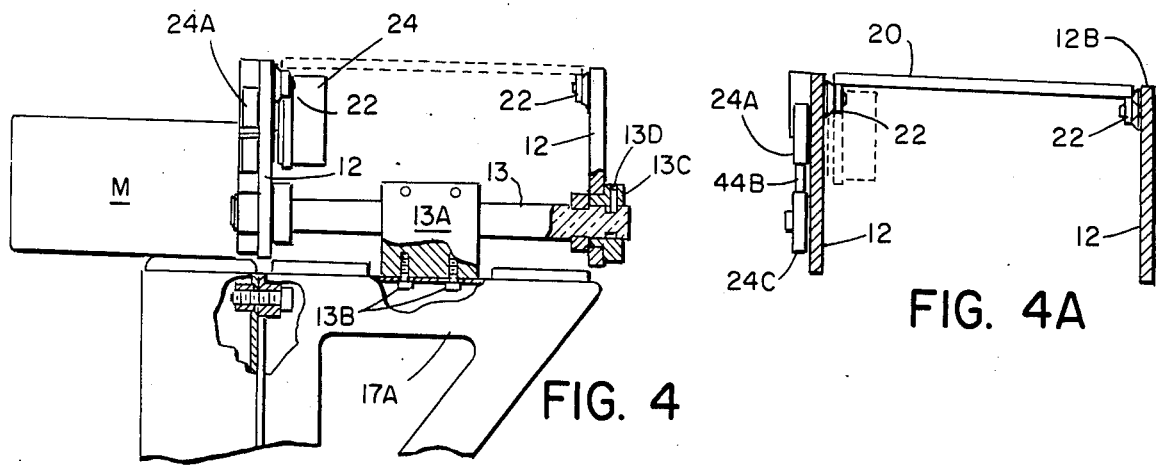
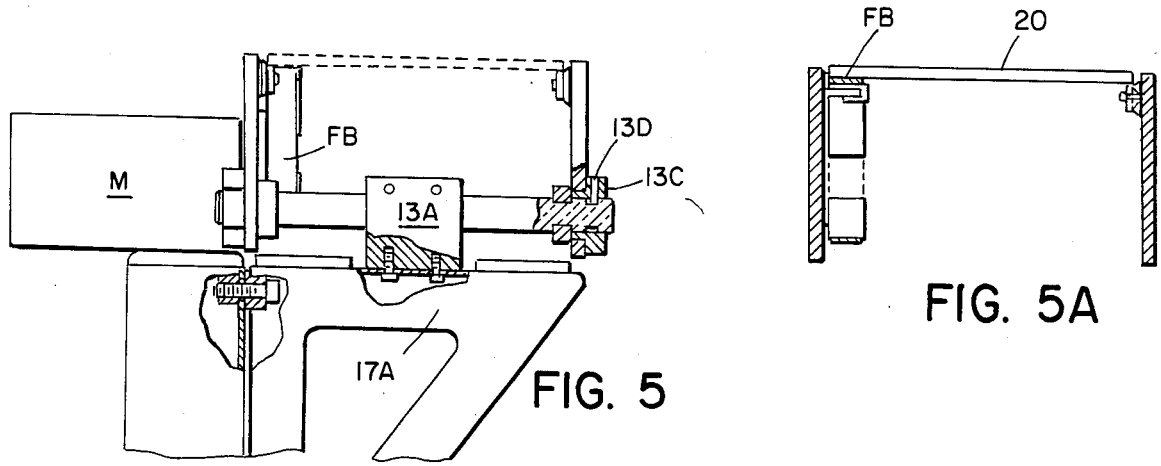
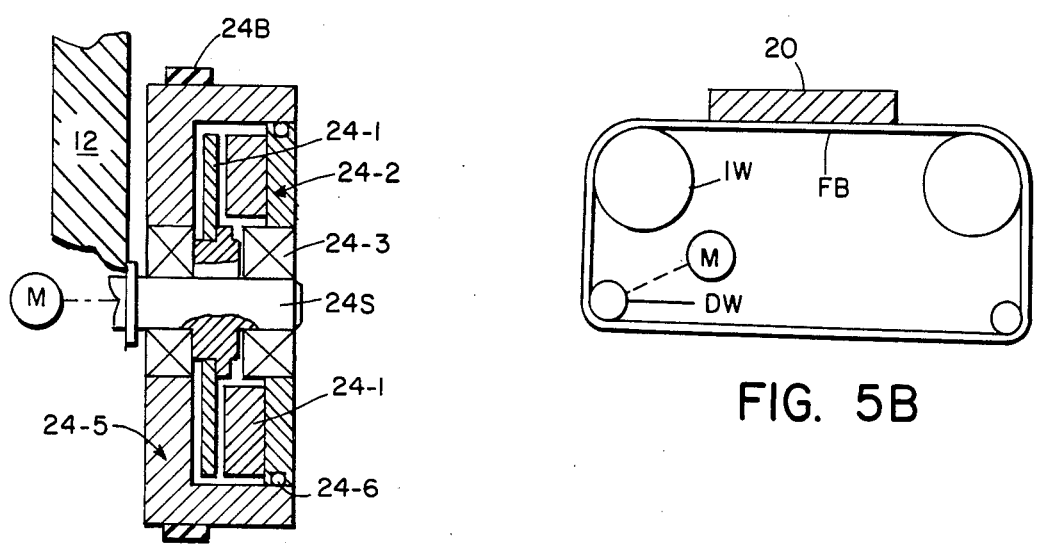

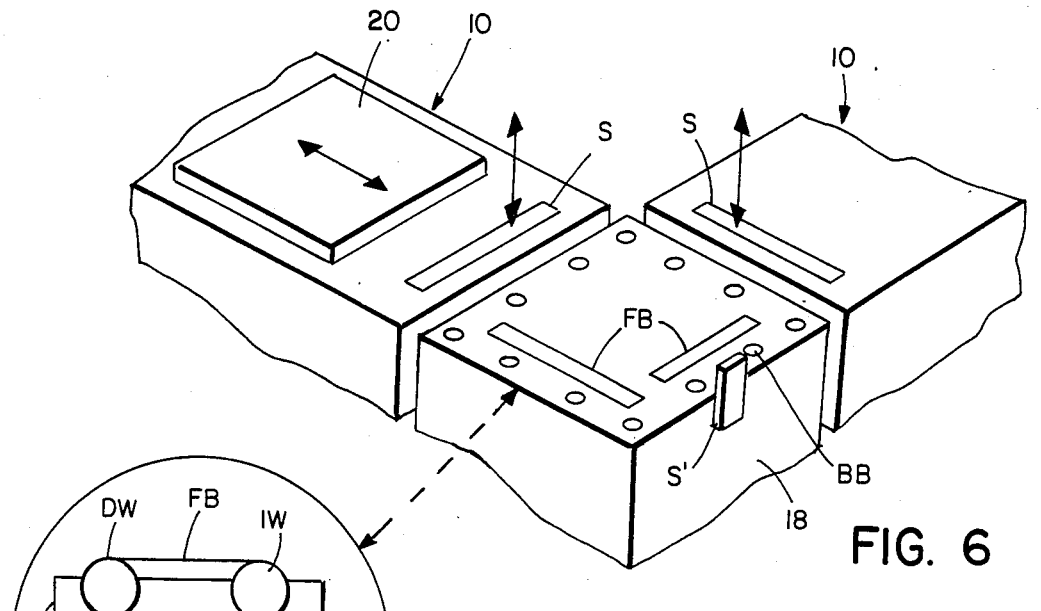
FIG. 6
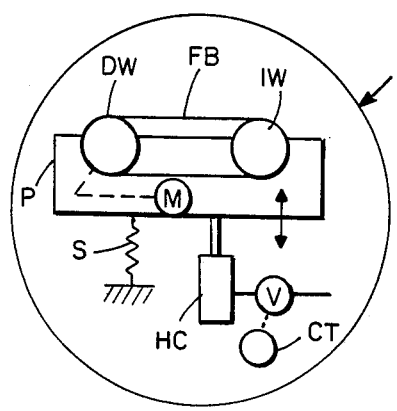
FIG. 6A
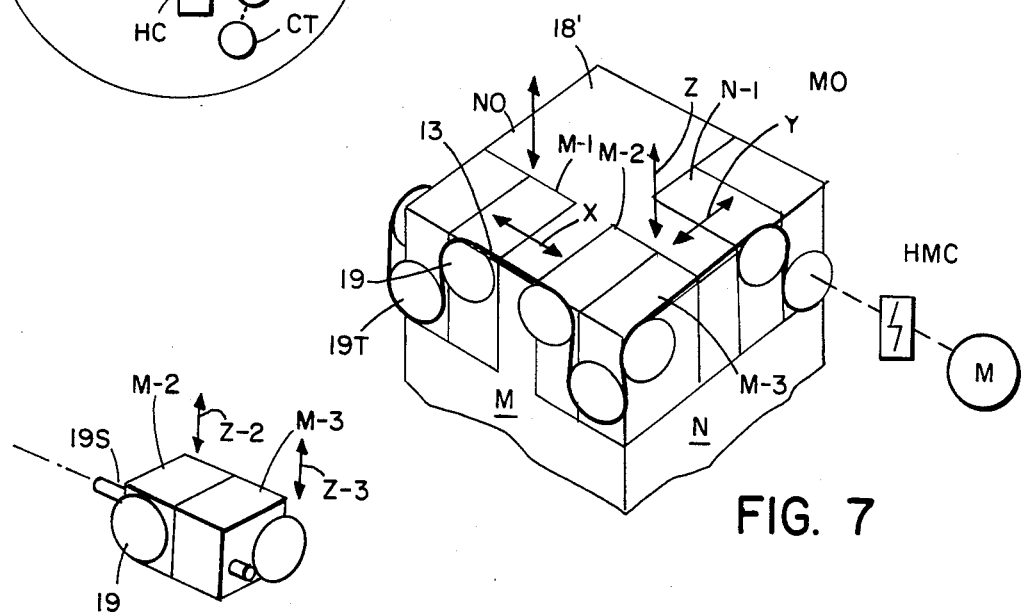
FIG. 7
FIG. 7A

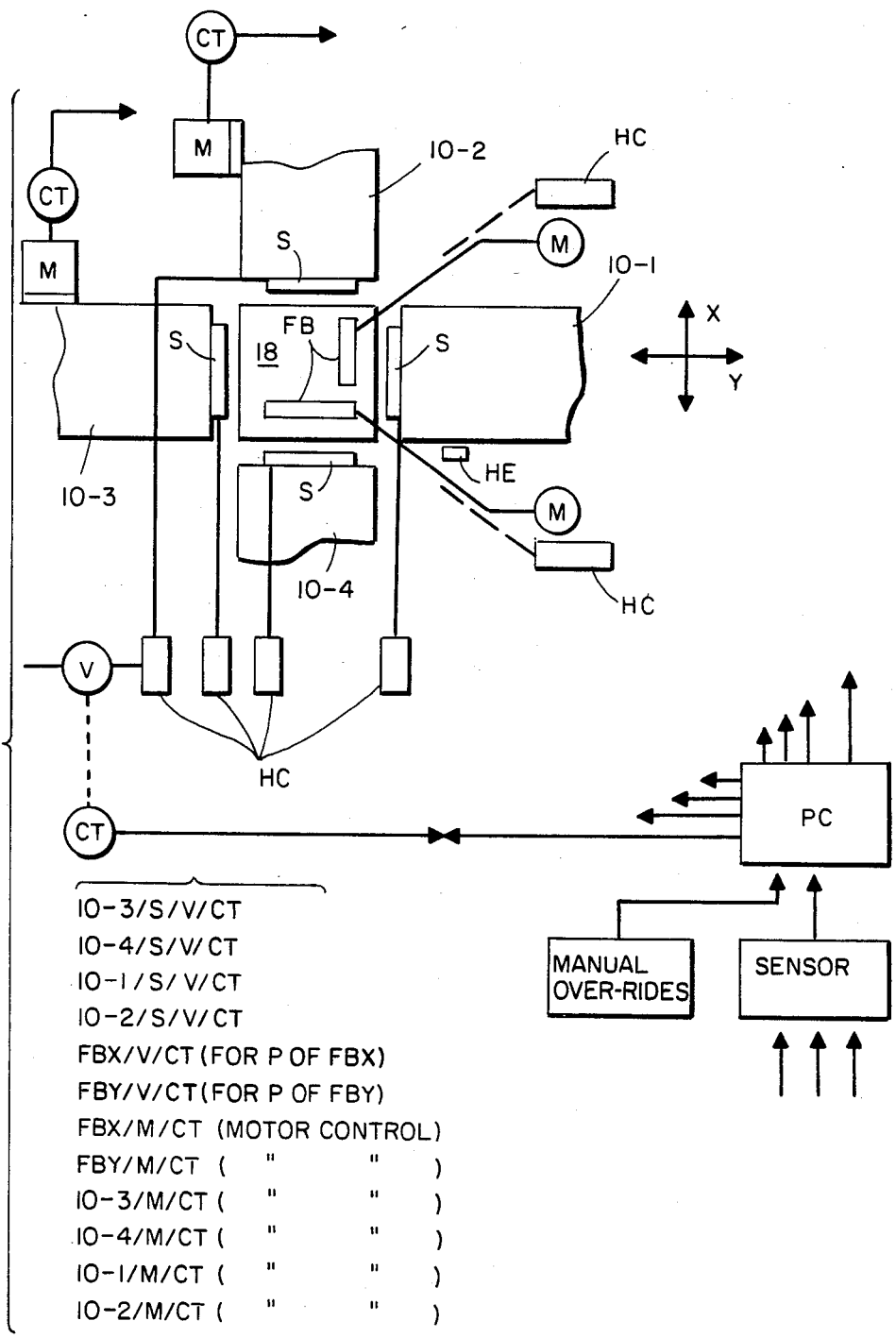

TRANSPORT SYSTEM FOR COMPUTER INTEGRATED MANUFACTURING/STORAGE AND DRIVE COMPONENT THEREFOR

BACKGROUND OF THE INVENTION

The present invention relates to materials transport, particularly in connection with programmable unit operations executable under computer control for manufacturing, assembly, warehouse storage and related assembly/diverson of parts and other like processing and equipment. The invention provides a system of conveying parts of a weight range of significant weight and/or applied force, typically on the order of ten pounds and ranging up to and over one hundred pounds including weight of parts conveyed, tare weight of trays, pallets and other movable holders and force applied by processing implements, such as as hand and machine tools at stations along the path(s) of transport of the parts. The invention is also characterized by realization of a practical modularity of construction and a high degree of freedom in design of plant layout. The invention further includes reduction of shedding and dust generation by the transport system per se to the point of suitablity for clean room operations.

The growth of computer integrated operations in factory, storage and other like environments has challenged the state of the art of materials transport.

It is an object of the art and of this invention to achieve precision in transport systems as the core of a modular system affording effective use in the range of weights, momentum, bulk and hardness of parts typically handled.

It is a further such object to provide appropriate degrees of design freedom in usage of such a system in connection with plant layout and in connection with differing transport schedules of different parts simultaneously handled by the system.

It is a further such object to minimize frictional losses and to minimize friction generated losses of power, efficiency and timing control in transport tasks of the class involved here.

It is a further such object to realize low capital costs in connection with transport tasks of the class involved here—avoiding costly, custom designed robotics installation with attendant complex sensors and finely tuned and balanced drives.

SUMMARY OF THE INVENTION

The foregoing objects are realized through the present invention by a transport system comprising: (a) a modular structural subsystem of standard lengths support beams, preferably in multiplicative-order series of integral multiples (1, 2, 4, etc.), a (a') longitudinal and lateral coordinates usage based on such multiples of standard beam lengths, (a") corner means enabling precise longitudinal/lateral linkage, (b) transport means for support and movement of parts over a matrix of parts created with said structural subsystem, including corner means, if any, used therein, and comprising (b') unit part carriers, e.g., a series of independent traveling pallets or trays separate from the matrix and the various carriers being asynchronously driven by a selected slipping or non-slipping friction drive mounted on the matrix (but alternatively including possible independent means such as rope or chain drives or pinion or worm gears associated with the pallets and interacting with corresponding matrix mounted members) and (c) the said drive means, which are constructed to provide an effective constant drive torque, but, in a preferred embodiment, to accommodate selective stopping of certain pallets without mechanical friction slippage and, therefore, without particulate generation from such slippage.

The system assumes possible utilization with external drive enhancing or drive limiting means (e.g., stops).

The drive means, which are usable in the foregoing transport system, and in other like applications comprise as key elements in said embodiment thereof repeated use of magnetic hysteresis couplings constructed and arranged to enable an asynchronous transport operation of multiple parts. For illustrative example, assume a linear stretch of the transport system of the invention comprising a pair of parallel rails mounted on parallel structural beams with idler rollers on the rails (mounted inwardly of the rails in the space defined therebetween) and separate part-transport pallets movable in a longitudinal series along such linear stretch. Assume also external stops which can selectively arrest motion of any selected ones of such pallets in order to effect machining operations thereon while not necessarily stopping other pallets. In the state of the art a frictional belt (or belts) in the space between the rails would normally drive the pallets and slip with respect to such pallets as are externally stopped, with resultant undue belt wear shortening service life, breakdown of drive precision and shedding of rubbed off belt particles to produce contamination.

The repeating drive element of the present invention obviating such difficulties is a module comprising (x) a power element and (y) a pallet mover interconnected by (z) means defining a magnetic hysteresis coupling constructed and arranged to yield a constant high torque to the pallet independent of differential speed between parts (x) and (y) above. Thus when a pallet is stopped, the corresponding drive linkage member can be stopped to eliminate slip and friction with speed of (x) maintained constant or varied as desired and with slippage transferred from the mechanical realm to the magnetic realm.

The transport system provides such drive elements to a frequency to insure pallet contact control throughout the desired locus of controlled pallet movement and stoppage in linear stretches of the system.

The drive elements are incorporated in corner turning portions of the transport system in a variant manner that enables simplified control of turns of pallet movement by selective contacts, of separate corner-mounted elements (y) with the pallet.

The deliberate incorporation of high hysteresis material as a driven member of the magnetic coupling insures high enough torque and a smooth (non-cogging) rotary movement.

The invention also comprises the modular transport system as a whole providing ease of assembly, disassembly and re-assembly in effective arrays for various tasks. Each array is reliably precisely aligned and stable and affords good access to workpieces carried thereby and the array components per se from several directions.

Other objects, features, and advantages of the invention will be apparent from the following detailed description of preferred embodiments thereof taken in conjunction with the accompanying drawing in which:

BRIEF DESCRIPTION OF THE DRAWING

FIG. 1 is an isometric view of a repeating length section of a preferred embodiment of the invention;

FIG. 2 is a plan view of such length sections assembled with corner members;

FIG. 3 is an isometric view of a portion of the array of FIG. 2 with ends of four length sections meeting at a corner piece (node);

FIGS. 4 and 4A are cross section views of one preferred realization the length section using a non-slipping drive coupling shown in cross section in FIG. 4B;

FIGS. 5 and 5A are cross section views of another preferred realization the length section using a slipping drive coupling shown in cross section in FIG. 5B;

FIGS. 6 and 7 are isometric views of two different preferred realizations of the corner member and FIGS. 6A and 7A show certain components, respectively of the FIGS. 6 and 7 items; and FIG. 8 is a layout of a corner node in the transport path similar to FIG. 3, but in plan view and schematically indicating related control systems.

DETAILED DESCRIPTION OF PREFERRED EMBODIMENTS

Referring now to FIGS. 1–3, it is seen that the transport system of a preferred embodiment of the invention comprises a linear path defining assemblage 10 for accommodating movement of workpiece (WP) carrying pallets 20 and made up of paired rails 12 one rail of each pair of opposed rails being mounted on truss form beams—indicated at 14A. Such beams are mounted on posts, e.g., as shown at 16. The assemblages 10 are mounted to define paths 10-1, 10-2, 10-3, 10-4, meeting at a corner member 18 which comprises means to selectively move a pallet 20 therein in x or y directions, forwardly or rearwardly.

Guide wheels 22 are mounted on the inner faces of both rails 12 of each pair. In one embodiment of drive shown in FIGS. 4, 4A, 4B, drive wheels 24 are mounted on the inner faces of rails 12A, 12B, etc. The pallet(s) 20 ride easily as indicated by direction-of-movement arrow A (FIG. 1), with low friction, on freely rotating guide wheels 22 and are constrained against movement laterally by a raised flange edge 22A of each such roller. A friction boot raised edge 24B of each drive wheel 24 engages the underside of the pallet and moves it in its path. In another embodiment of drive shown in FIGS. 5, 5A, a friction belt drives the pallets. But similar idler rollers are used.

As shown in FIGS. 1–2 (and in FIGS. 4–4A as well as FIGS. 5–5A for two embodiments of drive) each section 10 preferably has a lower beam 14B, as well as the upper beam 14A spanning the distance between spaced columns 16 for rigidity. Brackets 17A provide outrigger support to the distant rails 12 of each pair. Outrigger posts 16A tie into main posts 16 via short beams 17B.

As shown in FIGS. 1, 4, 4A, 5, 5A, a shaft 13 mounted in a bearing box 13A (seated on bracket 17A and secured thereto by bolts 17B) ties the rails 12 together via nuts 13C, at least one of which has a transverse hole accommodating an alignment pin 13D. Collars 13E further secure the rail placements on the shafts.

As a pallet 20 containing a workpiece WP is moved past a machine tool (MT), a stop S can be selectively activated (raised) to arrest motion of the pallet by the stop by intercepting the front edge of the pallet or by intercepting the earliest pallet in a line of pallets.

DRIVE SYSTEMS

The driving wheels 24 of each assemblage 10 of the FIGS. 1–3 and 4, 4A, 4B embodiments are preferrably driven in a ganged array by a single motor M mounted in cantilever fashion from that rail 12 of each pair which is directly supported from the beam 14. Each drive wheel 24 has a shaft 24S passing through rail 12 to an ancillary wheel 24A. A drive belt 24B and idler wheels 24C provide a closed loop drive system outside the rail 12 with the motor M driving one of the wheels 24/24A or a separate wheel on the closed loop drive system to provide motive power to all such wheels on the rail.

As shown in FIG. 4B, each wheel 24 comprises its shaft 24S and a drive rim 24-1, made of ferromagnetic material, coupled thereto. A separate portion 24-2 is rotatably mounted on the shaft, via spaced bearings 24-3, and includes a magnetic disk 24-4 of pie wedge form magnetic pole pieces in an annular array mounted thereon. Sections 24-1 and 24-4 are coupled magnetically and the drive of section 24-1 (direct or via a belt) transfers high torque to section 24-2/24-4 (on the order of 10–400 in.-oz., typically 30–40 in.-oz. in practical CIM applications for, e.g., milling, planing, drilling and like processing of small steel workpieces), which is a substantially constant torque notwithstanding weight, force and speed variations applied to pallet 20 (and thus to section 24-2/24-4) including a full stop of pallet 20 by a stop member S. Under the latter condition, rotary motion of section 24-2/24-4 of wheel assembly 24 stops; but high torque resulting in a high linear force in the direction A is constantly applied to stablize the position of pallet 20. When stop S is released the drive acting via section 24-2/24-4 (via the friction boot 24B) applies force to the pallet underside to immediately restart motion of pallet 20.

The drive wheels' (24) sections 24-4 comprise a circumferential pie wedge array of magnetic poles with alternating North and South poles and a disk form yoke 24-5 frictionally tied to 24-2 via an O-ring 24-6 and a tight fit. The poles of 24-4 are separated by a 0.01–0.04 inch gap (depending on desired coupling vs. practical mechanical tolerance) form a section 24-4 which is made of a magnetizable alloy, e.g., Alnico 5 which tends to lag the magnetizing flux in flux generated and collapsed (i.e., exhibit high hysteresis) so that a constant torque can be applied at the rim of 24-4 independent of speed differential between continuously driven section 24-1 and intermittently stopped section 24-4.

Another form of drive is shown in FIG. 5, 5A, 5B, comprising a friction belt FB running over a drive wheel DW (driven left or right by motor M, directly or indirectly) and idler wheels IW to move pallet 20. When pallet 20 is stopped by a gate or stop S (as shown in FIG. 3) the belt slips under the pallet. The pallets 20 are transported forward, resting on a continuously moving friction belt on one side, while rolling freely on guide wheels on the other. The weight of the pallet is evenly distributed between the two sides. This weight is a determinant in the degree of friction generated to move the pallet forward. Forward motion stops when the pallet encounters a stalled pallet, or when it comes up to a hard stop S (see FIGS. 3 and 6). In such an event the forward motion of the belt continues while the pallet remains stationary. If the stop is removed the pallet resumes its travel.

Referring again to FIG. 2 it is seen that each corner member 18 is one unit (preferably eight inches to foot)

squared. The length sections 10 are integral multiples of such unit in various lengths to provide arrays fitting various needs. The pallets 20 are (1) by (1) unit squares.

FIGS. 6, 6A, 7 show two embodiments of drive for the corner members 18 and an alternative form thereof 18′. Preferably the corner members are constructed as shown in FIGS. 6 and 6A. Two friction belts FW with associated drive, similar to the linear drive friction belts of length sections 10- according to the FIG. 5, 5A, 5B embodiments are provided. The belts can be operated in either direction and selectively. Preferably each belt FB of the corner member 18 and associated drive means is mounted on a plate P (FIG. 6A) which is arranged to be lowered by a hydraulic or pneumatic cylinder HC under control of a pilot valve V and controller CT. A compression spring S raises the plate (so that belt FB) engages a pallet 20 when pressure in cylinder HC is released. The reverse arrangement (the cylinder driving plate down against opposition of a tension spring) or a two way acting cylinder can be employed.

An alternative form 18′ of the corner member is shown in FIG. 7. Orthogonal sides M and N of corner member 18′ have high pallet driving wheels 19 and related idler wheels 19I which have a single drive belt 23 spanning around the corner member. A motor M is connected (via a hysteresis magnetic coupling MHC, essentially similar to the wheel assemblies 24 of the length sections) to one of wheels 19 which (via belt 23) drives the others. Each wheel 19 is mounted on one of sections M-1, M-2, M-3, N-1 and similar sections (not shown on the remainder of the periphery. These sections are movable along arrow Z via linear (or arcuate, which over a short length is like linear) movement under control of a drive (similar to the drive of the plates P in FIG. 6A). When sections M-1, M-2 are raised their wheels 19 can drive a pallet along the (I) path. When sections M-3 and N-1 are raised their wheels 19 can drive the pallet 20 along the path (II). Thus a simple, inexpensive and fast-response control is provided for cornering.

FIG. 7A shows how two adjacent sections, e.g., M-2, M-3, can be placed on a common shaft 19S and driven separately about said shaft by separate rotory or linear actuators (not shown) to pivot the respective section by a few degrees of arc (Z-2 or Z-3) to create the necessary movement for engaging its respective drive wheel 19 with the pallet 20.

The stops S (FIGS. 3 and 6) can be driven in the manner shown in FIG. 6A and discussed above for driving plate P. Where a length section 10 or corner 18 (or 18′) has an open end not leading to another section with a movable stop, a fixed stop can be provided as shown at S′ in FIG. 6.

All of the movable stops S, the corner drive engaging mechanisms of the embodiments of FIGS. 6-7 and the linear drive mechanisms of the embodiments of FIGA. 4-4B and 5-5B, as well as the drive motors per se are low inertia, quickly responsive drive means effecting single direction transport to a pallet 20 at any given time to enable such pallet, whether unloaded or loaded to move rapidly as single or in files, to be stopped abruptly as singles or in files without jumping the rails or shingling onto each other. Precision control can be applied to reliably account for every pallet's location under computer control. The matrix array of linear sections and corners can be applied in a variety of combinations from a limited range of modular lengths of sections 10 and related beams, brackets and posts consistent with the reliable location of pallets because of the fixed relationship of dimensions of these various parts. The variety of range is enhanced for simplicity by the single supporting beam 14A associated with each pair of rails 12 in a linear section 10.

The essentially frictionless drive of FIGS. 4, 4A, 4B can be used in factory areas where low shedding is a significant requirement and the frictional, slipping drive of FIGS. 5, 5A, 5B can be used where such requirement is of less importance. The friction and slipping of drive of corners 18 in FIGS. 6 and 6A and associated shedding is usually negligible even in clean room situations; but the non-slip alternative of FIG. 7 can be used if necessary.

FIG. 8 illustrates the integration of the mechanical features shown in FIGS. 1–7 with programmed controls. As shown above, a typical corner 18 can be a node at the x-y intersection, joining typical length sections 10-1, 10-2, 10-3, 10-4, each of which has a movable hard stop S at its end. The corner 18 has (in the FIG. 6, 6A embodiment thereof) driving friction belts FB, each of which has a drive motor and a lift plate under control of a cylinder, pilot valve and valve controller.

Each of the drive motors (M) for length sections 10-1, 10-2, 10-3, 10-4 has a controller CT. As shown in the table at the foot of FIG. 8, the controlling inputs can be provided to turn on/off the respective stop-pilot valve controllers for the stops shown in FIG. 8 at the ends of length sections 10-1. 10-4; for similar valve controllers (V/CT) of friction belts FBX and FBY; for the drive motor controls of FBX and FBY and for drive motor controls of sections 10-1 . . . 10-4. Other sensors can include limit switches and other mechanical means, optical means, magnetic means, electromagnetic means.

Communication can be provided from PC and/or the sensor readout panel to a remote computer and/or display and/or recorder.

These controls may be integrated with controls of machining or other work piece handling (see FIG. 3) apart from transport per se.

The integration of these advanced levels of controllability indicated above is enabled by the reliability of the transport system disclosed in FIGS. 1–7 and related text above.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. Transport system for programmed transport for machining, assembly and the like of workpieces or the like comprising, in combination,
   (a) means defining at least one transport path for movement of the parts and including means to selectively stop motion of the parts,
   (b) support means for supporting workpiece parts in said path and constructed and arranged for movement along said path,
   (c) drive means for moving said support means and continuously applying driving torque thereto whether said support means are moving or stopped by said means (a) and (b), the torque application being made during stops essentially without frictionally generating shedding of particles.

2. Transport system in accordance with claim 1 wherein said drive means (c) comprise means defining a motive power section and a support section and a hysteresis magnetic coupling therebetween.

3. Transport system in accordance with claim 2 wherein said drive means (c) comprise a plurality of wheel assemblies, each having a first powered section and a second section magnetically coupled to the first section.

4. Transport system in accordance with claim 3 wherein said second section has means for frictionally driving said support means (b).

5. Transport system in accordance with claim 2 wherein drive means (c) further comprises idler means for guiding said support means (b).

6. System for programmed transport of workpieces or the like comprising, in combination,
 (a) means defining a network of transport paths for movement of the parts and including means to selectively stop motion of the parts on one or more of the paths,
 (b) support means for supporting workpiece parts in said paths and constructed and arranged for movement along said paths,
 (c) drive means for moving said support means through said paths and for changing paths of movement of the supports and continuously applying driving force thereto,
  wherein said means (a) comprise a plurality of pre-formed distinct length sections having a common width to essentially all such sections and further comprise at least one corner section of square form based on said common width.

7. Transport system in accordance with claim 6 wherein said length sections are pre-formed modules, each comprising at least one elongated structual stiffness element spanning the required length and carrying said drive means thereon.

8. Transport system in accordance with claim 7 wherein pairs of parallel, elongated, structural elements are provided each carrying opposed drive means.

9. Transport system in accordance with claim 6 wherein drive means are mounted on at least two orthogonally related sides of said corner member.

10. Transport system in accordance with claim 6 and further comprising means for selectively engaging the drive means of one or the other of the sides of a corner member with support means thereon.

11. Transport system in accordance with claim 6 wherein:
 said means (a) comprise means defining multiple linear drive sections in an orthogonal array, means defining nodes at the junctions of orthogonally intersecting linear drive elements, said means (b) comprise pallet means for carrying loads on the linear drive sections and nodes,
 the linear drive sections, modes and pallets having a common width, the pallet being square and the linear sections; lengths being integral multiples of width,
 and said drive means (c) comprise reversible drive means associated with each linear section for driving the pallets along the length thereof in a single dimension, reversible, two dimension drive means associated with said node means for driving the pallets on and off the nodes in selected ones of orthogonally intersecting directions, and comprising two continuously running drives and means for selectively reversing drive direction and means for selectively engaging the drives with a pallet at the node, and further comprising,
 (d) movable gate means associated with each node to limit pallet movement to and from the node and means for driving said gate means, and
 (e) control means for accepting scheduling commands and implementing the same by activating node drives and gates and engagement thereof with pallets on the system to implement the scheduling commands.

* * * * *